Nov. 17, 1959     G. B. ALEXANDER     2,913,419
CHEMICAL PROCESS AND COMPOSITION
Filed April 18, 1956
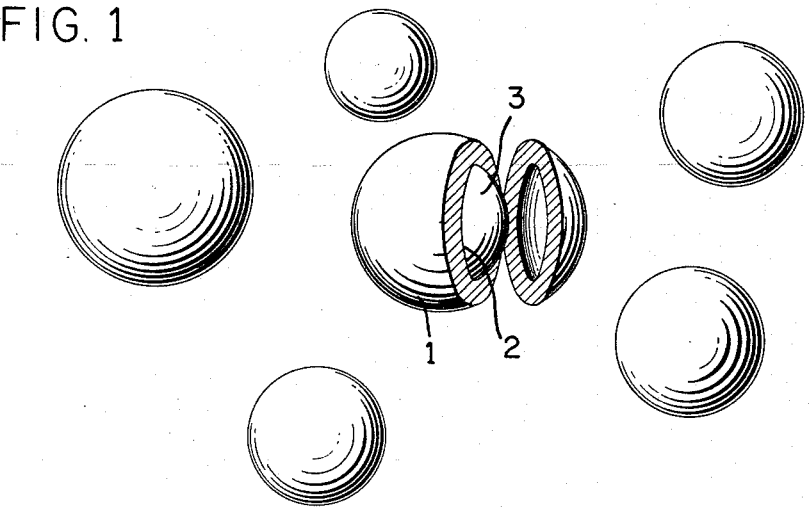
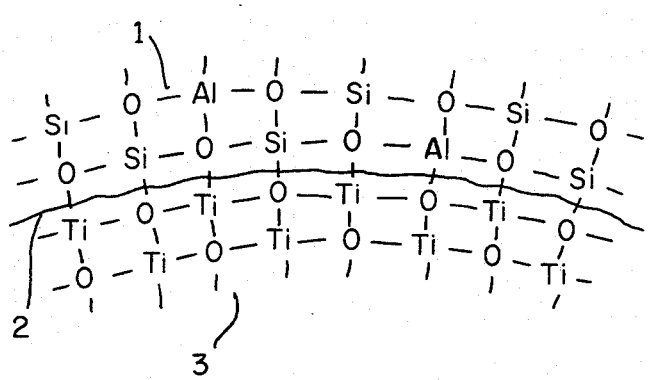
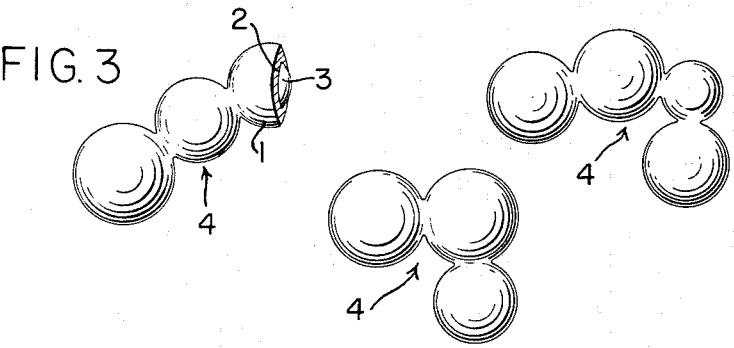
INVENTOR
GUY ALEXANDER
BY *Albert B. Triggs*
ATTORNEYS United States Patent Office 2,913,419
Patented Nov. 17, 1959

2,913,419

CHEMICAL PROCESS AND COMPOSITION

Guy B. Alexander, Wilmington, Del., assignor to E. I. du Pont de Nemours and Company, Wilmington, Del., a corporation of Delaware Application April 18, 1956, Serial No. 579,094

14 Claims. (Cl. 252—313)

This invention relates to finely divided products made up of particles which are composed of a skin of silica which contains chemically combined polyvalent metal atoms and a core of another material. The invention is also directed to sols of such particles and to dry particulate solids made of such particles.

The invention is also directed to processes for making these and other novel products by suspending in water finely divided nuclei which serve as cores and adding simultaneously active silica and a solution which contains ions of the metal to be combined with the silica in a dense shell or skin upon the core.

The particles in products of the invention present surfaces which are dense skins of amorphous silica containing chemically combined metal atoms of a metal which forms an insoluble silicate at a pH between 5 and 12. Within the skin is a core of another material. This core is often called herein a "hetero-nucleus." The hetero-nucleus will be defined more fully hereinafter.

The invention will be better understood by reference to the drawing in which:

Figure 1 shows semi-diagrammatically the particles of a product of the invention, one particle being shown partly in section, and Figure 2 illustrates the crystal lattice as it is believed to exist at the point of junction 2 shown in Figure 1.

Figure 3 shows a product of the invention similar to that of Figure 1 except that the particles are aggregated.

*The core*

The physical form of the cores or nuclei is important. It is a solid in such a state of subdivision that it has a specific surface area of at least one square meter per gram. One such type of solid is colloidal particles with a diameter from 1 to 100 millimicrons.

The particles which serve as cores may be somewhat larger than colloidal size but the specific surface should not be less than about one square meter per gram. For most solids this will mean that the particle size will not be larger than about a few microns. For silica spheres at a specific surface area of about one square meter per gram the particle diameter would be of the order of 3 microns. The specific surface area can range upwardly from one square meter per gram to 400, 500, or 600 square meters per gram or, if such substrates are available, even higher. The higher the surface area of a substrate the more readily it is coated with a skin according to the processes of the invention.

The cores can also be powders which are made up of aggregates of particles in the above size ranges. This would include gels and other porous bodies.

The particles which serve as cores or nuclei may also assume other physical shapes. They may, for example, be fibers or plate-like. Whatever the shape or state of aggregation, it is preferred that the ultimate particles have at least one dimension less than 5 microns and in every event, the surface area must be greater than one square meter per gram.

The cores or nuclei used according to the invention have a chemical composition different from that of the skin. It is for this reason that they are termed hetero-nuclei.

The important characteristic chemically is that the surface of the core be chemically receptive to the attachment of the skin. In this connection it will be apparent that the entire core need not be the same in composition. In other words, it is sufficient if the surface of the core is reactive while the interior may have any composition.

The core, or substrate, or nuclei should be covered with at least a mono layer of silica, a silicate or an oxide of a metal which forms an insoluble silicate at a pH between 5 and 12. Metals which fit this description are copper, silver, barium, magnesium, beryllium, calcium, strontium, zinc, cadmium, aluminum, titanium, zirconium, tin, lead, trivalent chromium, manganese, iron, cobalt and nickel. Thus, the core can have a coating of silica, or iron silicate or oxide, or titanium silicate or oxide. It will be understood that when an oxide of the metal is mentioned that the oxide may be hydrated, as many of them are in aqueous solutions.

If cotton, nylon, or other finely divided organic materials are used it will be evident that they must be provided with a surface of at least a monolayer of silica, a silicate or a metal oxide as described. This may be done, for example, by the adsorption of a metal ion such as chromium as used in mordanting.

Other examples of suitable cores are colloidal clays, finely divided metal powders, colloidal oxides, and fibers, such as those of asbestos, and glass.

A preferred class of nuclei are particles of silica. These may be in the form of gels or colloidal dispersions.

Silica sols offer very suitable cores for use according to the present invention. The sols are especially suitable when the size of the particle is from 5 to 50 millimicrons. Suitable sols, for example, are those shown in the Bird U.S. Patent 2,244,325 or Voorhees Patent 2,457,971. An especially suitable type of sol is that prepared by Bechtold and Snyder as described in their Patent 2,574,902, or by White in his Patent 2,375,738.

Suitable as hetero-nuclei are silica gels, particularly those having relatively wide pores such that the whole internal as well as the external surface can be covered with the skin. As an example there can be mentioned the aerogels of the Kistler Patent Number 2,093,454. Also there may be used gels made by gelling sols composed of colloidal silica particles larger than 10 or 15 millimicrons in diameter.

*The skin*

The primary characteristic of the skin is that it is composed in large part of amorphous silica chemically combined with polyvalent metal atoms. The metals are those which form an insoluble silicate at a pH between 5 and 12. It will be observed that these are polyvalent metals such as the following: copper, silver, barium, magnesium, beryllium, calcium, strontium, zinc, cadmium, aluminum, titanium, zirconium, tin, lead, trivalent chromium, manganese, iron, cobalt, and nickel.

It will be understood that combinations of these metals may be used and that small amounts of still other metals may be introduced into the skin; for instance, vanadium, molybdenum, and platinum can be introduced.

The skin is characterized by being of substantially uniform thickness, by being dense as will be hereinafter more specifically described, and by being continuous. It may be noted further that by continuous it is meant that the skin follows the configuration of the surface of the substrate. If the substrate is a gel then the skin will extend into the pores, leaving a porous product which has a decreased specific surface area but which still retains substantially the same shape.

In referring to the metal atoms as chemically combined it will be understood that they are homogeneously distributed through the skin and, because of the nature of the process, as the skin is applied both the silicon atoms and the metal atoms are codeposited. Since the silica and the metal are codeposited and since silica is known to combine chemically with the metal under the conditions of the coating process, it is believed that the silica and the metal are present in a chemically combined form.

The ratio of the silica to the metal may vary widely. In general it is desired that there be at least one silicon atom for each metal atom in the coating and this may run up to as many as ten silicon atoms for each metal atom. Even more than this amount of silicon can be included in the coating, and in the case of alumino silicate coatings, desirable results can be obtained when the ratio is as high as 200 silicon atoms for each aluminum atom.

The skin applied according to the invention is dense. That is to say it is not porous. This can readily be shown, for example, by measuring the surface area by nitrogen adsorption. It will be seen that if the coating were not dense but were porous the specific surface area of the product would be even greater than the surface area of the nucleus or substrate. Actually the surface area drops because when a dense coating is applied on a surface of given area, the specific surface of the composite product is less. It will also be observed that the skin is dense because in many cases it will be possible to subject the nucleus which is coated with the skin to chemicals which would attack the substrate but not the skin, and the skin will be found to protect the substrate from the reagent.

It has already been pointed out that the surface of the substrate should be receptive to silica. By this it is meant that the silica is chemically combined with the surface of the substrate and as the skin is thereafter increased in thickness the skin as a whole will be chemically attached to the surface of its substrate.

Products of the invention can readily be identified. For example, a reagent may be used which will dissolve or attack the skin but not the substrate and the skin can be removed. This can be used as an analytical method to determine the thickness of the skin and its relation to the substrate. For example, a coating of sodium alumino silicate on nuclei of amorphous silica can be removed by dissolving away the skin with a strong acid.

It will be observed that the skin or coating will ordinarily vary in thickness depending upon the particular use to which the product is to be put. The thickness of the skin should ordinarily be at least a few atoms and, for instance, the skin should for most purposes not be thinner than about three millimicrons corresponding to, say, 5 to 10 atomic diameters. Generally then, it will not be found desirable in most cases to have a skin thicker than about 50 millimicrons, and for the majority of uses it will be sufficient to have a skin no thicker than 25 millimicrons.

It is to be observed that the skin need not be homogeneous throughout but that the first layers may contain one metal while a subsequent layer may contain another. Again, the first layer may contain the metal in a different proportion from the second layer.

In addition to the polyvalent metal it will sometimes occur that monovalent atoms such as sodium will be combined into the skin composition. This is particularly the case when aluminum atoms are introduced with silica in the skin.

Skins composed of a sodium alumino silicate are a preferred aspect of the invention. Instead of sodium the monovalent ion can be potassium, ammonium or lithium.

When a monovalent ion is introduced into the skin as just noted, it can be removed by ion-exchanging it out and replacing it with other ions such as hydrogen, or ammonium, or polyvalent metal ions.

*Application of the skin to the core*

Processes of the invention are carried out by suspending the material to be used as the substrate or core in water, and by then adding thereto, simultaneously, active silica and a solution containing ions of the polyvalent metal which is to be present in the skin. Throughout, the pH should be maintained between 5 and 12.

The silica is added as "active silica." In general, it may be said that "active silica" is very low molecular weight $SiO_2$, which may be added as such to the solution, or formed in situ as by the addition of acid and a soluble silicate.

When sodium silicate is acidified, silicic acid is released. This silicate acid initially may be in the form of orthosilicic acid, $Si(OH)_4$, but a condensation reaction occurs, whereby two silanol

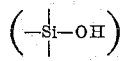

groups react to form a siloxane

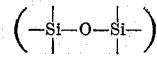

bond. This condensation may proceed until a predominant proportion of the silanol groups present have been used up to form siloxane bonds; the polymer thus formed will have a high molecular weight and the silica in it may be defined as "inactive." On the other hand, it will be understood that by the term "active" silica is meant silica in a low degree of polymerization. Thus, in active silica the condensation between silanol groups has not proceeded to a predominant extent.

It should be understood that active silica includes not only monomeric silica, but also certain polymeric forms of silica which are capable of depolymerization under suitable conditions, and hence are active for the purposes of the present invention. The rate of depolymerization under controlled conditions provides a measure of whether or not a particular silica is active within the meaning of the term as used in describing this invention. Active silica may be defined as any silica in molecular or colloidal aqueous solution in such a state of polymerization that when diluted with sodium hydroxide solution to a pH of about 12, corresponding to an alkali concentration of N/100, and an $SiO_2$ concentration of about 0.02% by weight at 30° C., in the absence of cations other than sodium, the silica will depolymerize to monomer in not more than 100 minutes.

The amount of monomer in a particular solution may be determined by measuring the amount of color developed with molybdic acid. It was shown by Harman (J. Phys. Chem., vol. 31, 616–25 (1927)) that yellow silico-molybdic complex acid is formed by reaction of molybdic acid with ionic or "crystalloidal silica" but not with colloidal silica. I confirmed this observation, and concluded that only monosilicic acid forms the yellow complex with molybdic acid. Hence, the rate of depolymerization of silica in the dilute alkaline test solution can be followed over a period of time by taking samples and determining the amount of monomer present.

Specifically, the depolymerization test is carried out by adding the silica sample to such quantity of a dilute solution of sodium hydroxide that the pH of the mixture is about 12 (corresponding to 0.01 normality of alkali) and the total concentration of $SiO_2$ is 0.02%. This mixture is held at 30° C. for a measured time after preparation, and then tested for monomer. Five ml. of the depolymerizing solution are mixed with 45 ml. of a molybdic acid reagent made up by diluting 25 ml. of 1 N sulfuric acid and 10 ml. of 10% (by weight) ammonium molybdate solution to a total of 225 ml. The molybdic acid reagent is sufficiently acidic to stop the depolymerization of silica in the test sample. Thus, the time interval of depolymerization is taken as the time between the mixing of the silica sample with sodium hydroxide solution and neutralizing of this solution with molybdic acid reagent. The color developed in the depolymerizing solution and the molybdic acid reagent at 30° C. is measured with a Model DU Beckman photoelectric quartz spectrophotometer at a wave length of 400 millimicrons. The color reading is taken after about two minutes, since the reaction of monomeric silicic acid with molybdic acid is essentially complete in that time. The amount of monomeric silica corresponding to this color is determined by standardizing the color against a known amount of sodium orthosilicate.

While silica which depolymerizes completely in not more than 100 minutes by the depolymerization test is considered to be active and may be used in the present invention, it is preferred to use silica which will depolymerize completely in not more than 5 minutes. In sodium silicate solutions having an $SiO_2:Na_2O$ mole ratio below 3.9, the degree of polymerization of the silica is very low, since when these solutions are subjected to the depolymerization test for activity, the time required for formation of monomer is usually less than one minute. Consequently, the silicic acid released the instant these solutions are acidified is in an extremely active form.

An aqueous dispersion of active silica may be prepared at ordinary temperatures for use in this invention by any of a number of methods with which the art is familiar. Methyl silicate or silicon tetrachloride may be hydrolyzed with water under conditions to produce a dilute sol, or sodium ions may be removed from sodium silicate by ion-exchange resins as taught by Bird, United States Patent 2,244,325. The active silica obtained by any of these methods should be used as soon as prepared, because the condensation reaction mentioned above proceeds quite rapidly, rendering the silica inactive.

A method which has outstanding economic advantages in the preparation of active silica for use according to this invention consists in releasing active silica by partially neutralizing a soluble silicate, such as sodium or potassium silicate, with an acid such as sulfuric, hydrochloric, or carbonic, in the pH range of 8 to 11.

Preferably, this acidification occurs in the presence of the hetero-nuclei prepared as already described, so that the liberated active silica can immediately be deposited along with the polyvalent metal ions.

Instead of releasing the active silica in the presence of the hetero-nuclei, by the partial neutralization of a silicate with an acid, the acidification may, if desired, be carried on out of contact with the hetero-nuclei providing the active silica is caused to deposit along with the polyvalent metal ion before it has become inactive through polymerization, that is, before it has aged or been heated to an elevated temperature.

The preparation of active silica is described in further detail in U.S. Patent 2,731,326 January 17, 1956 of Alexander, Iler, and Wolter. Active silica which is substantially salt-free is described together with methods for its preparation in U.S. Patent 2,577,484, issued December 4, 1951, to Joseph M. Rule.

It is important that the active silica and the metal ion to be codeposited to form the skin be brought together into the system at the same time. If the silica is introduced first it will deposit without the metal. Also, the silica and the metal must not be brought together outside the presence of the nuclei since they will react with each other.

This means that the separate streams of polyvalent metal salt solution and source of active silica should be brought simultaneously into intimate contact with the suspension of the hetero-nuclei with thorough agitation. The most practical way to do this is to insure thorough agitation and high turbulence at the point where the reactive solutions are introduced into the suspension of the hetero-nuclei. This may conveniently be done by introducing the two reaction solutions into the intake side of a centrifugal pump through which the suspension of hetero-nuclei is being drawn as the main stream.

The solution containing metal ions may contain the metal ions either in the form of cations or anions. Certain metals such as aluminum are amphoteric and the aluminum may be introduced either as a salt, such as aluminum chloride, or it can be introduced as a solution of sodium aluminate. When the soluble compounds are introduced into the suspension they assume a form which is characteristic of the pH and are introduced into the skin structure.

Zinc and lead can be added either as cations or anions as, for example, zinc chloride or sulfate or sodium zincate. Lead can be added as lead nitrate or sodium plumbate. Metal ions may also be introduced in the form of complex ions which are readily dissociated, such as in an ammonical solution of copper hydroxide.

The other metals previously listed can also be introduced in the form of their various soluble compounds. It will be obvious to a chemist not to use salts which will introduce ions which will cause precipitation of metal compounds which are less soluble than the metal silicates. For example, barium should not be introduced in a system containing sulfate ions.

The pH of the system should be maintained between about 5 and 12. This can be done by adding suitable proportions of either acids or alkali, depending upon what type of soluble metal compound is being used and upon the ratio of alkali to silica in the sodium silicate which is employed. In most cases operation will desirably be effected in the range from pH 8 to 11. It will be understood that any suitable acid or alkali may be used, and there may be employed, for instance, mineral acids such as hydrochloric, sulfuric, nitric, or carbon dioxide. Again, one may use sulfamic acids or organic acids.

It will be understood that in particular situations the selection of pH will be determined by the nature of the substrate and the particular metal ion which is to be introduced into the skin; for example, if a silica sol is to be used as the nuclei it is preferred not to operate above about pH 10.5 or below about pH 6.

Concentration is a quite important consideration also. In general, the process should be operated with relatively dilute solutions. High concentrations of electrolyte tend to promote the combination of the metal ion with the silica prior to their deposition upon the substrate as a skin. In general, it is preferred to operate under such conditions that the concentration of the monovalent cations in the medium is less than about 1 normal. For practical reasons the solids content of the reaction mixture will be above about 1 percent.

The concentration of the insoluble substrate can be varied widely. It is desirable to maintain in the reaction medium a relatively large amount of surface. For substrates of low specific surface area relatively high concentrations in suspension may be provided. This should not be so high as to make the suspension too viscous to be agitated thoroughly. Ordinarily at least one percent by weight of the substrate should be present in the suspensions, since smaller amounts than this will make it necessary to add the reactants at an extremely slow rate.

The rate of the addition of the active silica and the metal ions is an important process consideration. If these two reactants are introduced more rapidly than they can be deposited as a skin upon the substrate, then they combine to form a separate precipitate in the reaction medium, thereby wasting raw materials and contaminating the product.

The rate at which reaction will occur is related to the pH, the concentrations of soluble electrolytes such as sodium sulfate, the temperature, the ratio of silica to polyvalent metal ions, the particular polyvalent metal ion being used, and the surface area of the substrate provided in the solution. The relation between time and temperature, other things being constant, may be roughly estimated by the observation that the reaction rate doubles for every 10° C. rise in temperature. The greater the total surface of substrate provided in a given volume of the reaction medium the more rapidly the addition of the reactants can be made.

During the coating process the addition of active silica and solution containing metal ions is effected at a rate such that the specific surface area of the product present in suspension decreases. When the addition of reagents is too rapid and a precipitate of metal silicate occurs the product contains this precipitate and the specific surface area of the mixture will be higher than that of the substrate. On the other hand if the reaction is carried out in the desired manner so that most of the reactants is deposited as a skin upon the surface of the substrate then the specific surface area of the product in suspension decreases. Accordingly, it is important to control the rate of addition of reactants so that the specific surface area of the product in suspension decreases during the process. This can be determined by taking a sample after a particular rate of addition of reagents and measuring the specific surface area of the coated substrate by nitrogen adsorption.

The procedure for doing this differs in the case of sols from that in the case of hetero-nuclei present as a supercolloidal suspension. In the case of sols the surface area may be determined by the following type of procedure. A small amount of a coagulant, such as methyl alcohol, is added to bring about precipitation or gelling of the particles in the sol. The wet precipitate or gel is washed with distilled water to remove soluble salts then with a water miscible organic solvent such as acetone until all of the free water is removed. The solvent is then removed under high vacuum and the surface area of the resulting powder is determined by nitrogen adsorption. The method used is that of P. H. Emmett, "A New Method for Measuring the Surface Area of Finely Divided Materials and for Determining the Size of Particles," Symposium on New Methods for Particle Size Determination in the Sub-Sieve Range, p. 95, published by the American Society for Testing Materials, March 4, 1941.

Where the product is a suspension rather than a colloidal solution the product is filtered from the reaction medium, washed with distilled water and acetone as described above and surface area is then determined by nitrogen adsorption as described above.

Since in forming the skin the rate of reaction is greater at elevated temperatures, it will ordinarily be desired to use a temperature of 60° C. or above. Reaction at lower temperatures must be conducted quite slowly, sometimes requiring a period of days or weeks. Temperatures above boiling can be attained if desired by the use of pressure, or there can be used temperatures up to, say, 125° C. or, if suitable pressure equipment is available, higher. The most practical and economical range for operation will be between 60° C. and 100° C. while more specifically it will usually be found desirable to use temperatures between 95° C. and 100° C.

As will be evident from the foregoing description, the products are composed of a substrate, which has a specific surface area in excess of one square meter per gram, covered with a skin. The substrate can be formed of an aggregate of ultimate particles which preferably have at least one dimension of less than 5 millimicrons, as shown in Figure 3. It is preferred for many purposes that the particles be in the colloidal size range, say, 1 to 100 millimicrons, as shown in Figure 1.

The skin applied to the substrate or core is from 3 to about 50 millimicrons thick though preferably it does not exceed about 25 millimicrons. The skin is dense and this can be determined by comparison of the surface area of the coated particle with the specific surface area of the core or substrate. The products of the invention have a specific surface area lower than that of the core or substrate.

The skin coating will have an average thickness within the ranges as indicated and from particle to particle the thickness will be surprisingly uniform. The thickness is visualized, as illustrated in Figures 1 and 3, as being uniform on each particle though, of course, there is undoubtedly some roughness.

If the products are sols they may be used as such. Or they may be concentrated before use if desired. Depending upon the materials used it may be preferred to remove soluble metal salts by such a process as dialysis or ion-exchange using a suitable ion-exchange resin. The sols can also be dried by evaporation of water or the water may be removed by azeotropic distillation with an alcohol such as butanol or isopropanol or another partially miscible liquid. Alternatively it may be desired to transfer the dispersed particles to a liquid other than water, for example, ethylene glycol, and this may be done by adding ethylene glycol and removing the water. Alcohols such as those above mentioned can similarly be used.

Where the materials are large enough to be recovered from the reaction medium by filtration or by centrifuging this can be done. Soluble salts can be separated by washing with water. The products may either be dried from water or may be dried by azeotropic distillation by the use of suitable solvents such as normal butyl alcohol. The water may be displaced from the precipitate by the use of water miscible organic solvents such as normal propanol, butanol, ethyl alcohol and so forth.

Because of the wide variation in the properties of products produced according to the invention they will be found suitable for a very wide variety of uses. Sols made according to the invention may be used in emulsions of water insoluble organic materials such as rubber, polyvinyl acetate, resin emulsion paints, and wax emulsions. They may also be used in solutions of organic materials such as adhesives such as polyvinyl alcohol. In cases in which the metal ions in the coating have insecticidal or fungicidal properties the sols containing these may be used for such purposes.

Finely divided products produced according to the invention may be used as fillers in plastics, as thickeners for various aqueous and organic systems. Metal powders coated in accordance with the present invention will be found to be protected against corrosion but will still be useful for many purposes in which their metallic nature is important.

Gels or porous substrates with skins according to the invention may be used as catalysts. It is to be observed that in preparing a catalyst a moderately coarse gel structure must be used since otherwise it will be closed up in the coating process. If, for example, a gel has a pore diameter of 10 millimicrons then if a coating of 3 millimicron thickness is applied the final pore diameter will be 4 millimicrons. Thus with larger pore diameter gels it will be possible to produce somewhat heavier skins but in every instance care should be taken that the pores are not completely closed. The substrate or core used in making products suitable as catalysts should have an average pore diameter greater than 10 millimicrons and a surface area of from 10 to 400 sq. meters per gram. The thickness of the skin should be small enough that the pore diameter of the coated product is at least 4 millimicrons.

The invention is particularly applicable to glass fibers in order to form protective abrasion resistant coatings on these otherwise fragile materials. The coatings also prevent slippage of the fibers in fabricated articles.

It is to be noted that when gels having a skin and prepared in accordance with the invention are milled vigorously in rubber or in grease or in other viscous media the milling may be severe enough to fracture the particles. In this event the substrate may then be exposed in areas with some advantage.

In order that the invention may be better understood the following illustrative examples are given in addition to the numerous examples already described.

*Example 1.*—A silica sol is prepared by diluting commercial sodium silicate having a $SiO_2:Na_2O$ mole ratio of 3.36 with water such that the $SiO_2$ content is 40 grams per liter of solution. This solution is heated to a temperature of 95° C. A solution of dilute sulfuric acid (about 4.7 grams of $H_2SO_4$/100 ml.) is then added over a period of about 2 hours at a uniform rate, one volume of acid solution being added for about 3 volumes of silicate. The concentration of the acid is so regulated that about 80 percent of the $Na_2O$ in the silicate is neutralized. The sodium ion concentration should be 0.3 normal. The final pH of the silica sol is about 10.2.

The particles of colloidal silica are dense, spherical, relatively uniform in size and have an average diameter of about 21 millimicrons. They are discrete, separate and non-aggregated.

Two and one-half liters of 3 percent silica sol prepared as above-described are diluted with two and one-half liters of water. This sol, which contains 1.5% $SiO_2$ consisting of discrete dense spherical silica particles having an average diameter of 21 millimicrons, will hereafter be referred to as the "heel."

To 2500 ml. of the heel there are added simultaneously but separately and at a substantially uniform rate over a period of 2 hours, 1500 ml. of sodium silicate solution made by diluting 252 grams of a commercial sodium silicate solution with water to a $SiO_2$ content of 5 grams per 100 ml. (0.833 mol per liter), 2000 ml. of a sulfuric acid solution containing 46 grams of 95.5% $H_2SO_4$, and a sodium aluminate solution prepared by dissolving 66 grams of sodium aluminate in 1.5 liters of water. The reaction mixture is maintained at a temperature of about 95° C. during the entire process and within a pH range of from 10.0 to 11.1, the pH at the end of cycle being 10.52. In order to maintain this pH range it is necessary to add only about 60% of the sulfuric acid calculated to be equivalent to the total $Na_2O$. Very vigorous agitation is provided in the reaction zone.

The product resulting from the process is a sol. The product is illustrated in Figure 1 in which the particles of sol are shown. The particles are composed, as seen in the sectional view, of a silica core 3 and a skin 1. The sol may be readily coagulated with methyl alcohol and dried at 110° C. to give a product which is characterized by having a specific hydroxylated surface area of 104 m.$^2$/g. on which methyl red is adsorbable from benzene solution ($S_d$).

The sol of Example 1 may also be coagulated with calcium ions to give a product having a pH of 9.6 and an $S_d$ of 27.8 m.$^2$/g.

*Example 2.*—To a heel prepared in the manner described in Example 1 and consisting of 10 liters of a 1.5% sol, there are added simultaneously but separately at a substantially constant rate over a period of 2 hours three liters of a sodium silicate solution containing 0.833 mol of $SiO_2$ per liter and having a sodium ion concentration of 0.50 normal, four liters of sulfuric acid having a molarity of 0.325 mol per liter, and three liters of sodium aluminate having a molarity of 0.47 mol $NaAlO_2$ per liter.

The concentration of the sulfuric acid is regulated so that about 80 percent of the $Na_2O$ in the silicate is neutralized. The atomic ratio of silicon to aluminum added to the heel is about 1.8, while the acid to alkali ratio, $SO_3/Na_2O$, is about 0.90 in contrast to a ratio of 0.59 in Example 1. The pH of the sol at the start of the accretion of alumino-silicate is 10.0. After a period of one hour the pH drops to 6.60, and finally to 5.62. Apparently the sodium ion is built into the skin of aluminosilicate.

The product is filtered, washed with hot water, dried and ground to about 200 mesh. The product so obtained is in the form of dense spheres, relatively uniform in size, having a diameter of about 25 millimicrons. The specific surface area of the product is 138 m.$^2$/g. (by nitrogen adsorption). Analyses show that the product contains 66.6% $SiO_2$, 7.2% aluminum and 3.4% sodium.

The product of Example 2 may be ion-exchanged with calcium ions to give a coated silica having by analysis 69.0% $SiO_2$, 7.6% aluminum, 0.8% sodium, and 2.2% calcium.

*Example 3.*—A silica sol is prepared as in Example 1 with the exception that the composition of the heel comprises two percent silica.

To twenty liters of the heel there are added simultaneously and separately over a period of one hour five liters of sodium silicate having 0.67 mol of $SiO_2$ per liter and a sodium ion concentration of 0.4 N, five liters of an aqueous solution of sodium aluminate containing 0.44 mol $NaAlO_2$ per liter, and five liters of 0.163 molar sulfuric acid. Since the pH of the reaction mixture tends to increase from 10.0 to 11.7 during the additions of silicates, an extra quantity of sulfuric acid is added. It is believed that not all of the aluminum goes into the four coordinate state under these conditions. The $SO_3:Na_2O$ ratio is 0.39. The Si:Al ratio of the product is 1.5.

The sol prepared in the above manner is coagulated with trimethylcetylammonium bromide, and the coagulated material filtered. The pH of the product so obtained is adjusted to 7. The product is then washed, dried and ground. The resulting product has a specific surface area as determined by nitrogen adsorption of 61 m.$^2$/g. The number average diameter of the particles of which the product is composed has been determined from electron micrographs to be 30 millimicrons.

*Example 4.*—This is an example of a reticulated silica which is coated with a skin of amorphous silica containing zinc. The first step in the process is the preparation of a reticulated silica by the reaction of a sodium silicate solution containing 2% $SiO_2$ and having a $SiO_2:Na_2O$ mole ratio of 3.36 with 0.5 N sulfuric acid at 30° C. in the following fashion:

Nine liters of silicate solution was placed in a reactor with a high speed stirrer, and to this solution 3 liters of sulfuric acid was added over a period of 30 minutes, while maintaining the temperature at 30° C. The resulting silica sol was heated to 95° C. and then treated with silicate and acid.

Thus silicate and acid solution were added simultaneously but separately to the sol while maintaining the temperature at 95° C. The sodium silicate solution was prepared by diluting 400 grams of sodium silicate (containing 29.4% $SiO_2$ and having a $SiO_2:Na_2O$ mole ratio of 3.36) to 1.2 liters. The sulfuric acid solution was prepared by diluting 51 grams of 95.5% $H_2SO_4$ to a volume of 1.2 liters. These solutions were added at a uniform rate over a period of 80 minutes.

In this manner, a reticulated precipitated silica in the form of an aqueous slurry was prepared, the washed and dried silica itself having a surface area of about 375 m.$^2$/g.

This reticulated silica was coated with a skin of silica containing zinc in the following manner:

Solutions of zinc sulfate and sodium silicate were added simultaneously but separately to the aqueous slurry of reticulated silica, at uniform rates, over a period of 40 minutes, while still maintaining the temperature at about 95° C. The sodium silicate solution was prepared by diluting 200 grams of commercial silicate containing 29.4% $SiO_2$ and having an $SiO_2:Na_2O$ mole ratio of 3.36 to a volume of 600 mls. The zinc sulfate solution was prepared by dissolving 30 grams of $ZnSO_4 \cdot 7H_2O$ in water, adding 22 grams of 95.5% $H_2SO_4$, and diluting to a total volume of 600 mls.

The resulting slurry was filtered, the precipitate was washed with water, reslurried in water which was pH adjusted to 7 with dilute sulfuric acid, and refiltered. This water wet filter cake was then slurried in normal butanol and the water removed by azeotropic distillation. The anhydrous butanol slurry was heated to 200° C., cooled, and the butanol removed by drying in an oven at a temperature of 140° C.

The final product had a specific surface area as measured by nitrogen adsorption of 254 m.²/g., a hydroxylated surface area as measured by the adsorption of methyl red dye from benzene of 88 m.²/g., a density under a pressure of 3 p.s.i. of 0.10 gram per ml., an $SiO_2$ content of 82.3%, zinc 1.81%, and carbon 6.3%, said carbon being present as butoxy groups combined with the silica by the reaction with butanol. The product was hydrophobic.

*Example 5.*—This is an example of a reticulated silica which has a skin of amorphous silica containing copper.

This example is similar to Example 4, except that a solution of copper sulfate was used in place of zinc sulfate, 25 grams of $CuSO_4 \cdot 5H_2O$ having been used to prepare the copper sulfate solution.

The product was characterized by having a surface area as measured by nitrogen adsorption of 285 m.²/g., a density under a load of 3 p.s.i. of 0.09 gram per ml., an $SiO_2$ content of 81.5%, copper content of 1.79%, and carbon of 6.91%, said carbon being present as butoxy groups combined with the silica by the reaction with butanol. The product was likewise hydrophobic.

*Example 6.*—This example is similar to Examples 4 and 5, except that the reticulated silica core has a skin of silica containing lead.

The procedure followed was the same as that of the preceding example except that lead acetate [40 grams of $Pb(C_2H_3O_2)_2 \cdot 3H_2O$] was used instead of copper sulfate.

The product was characterized by having a surface area of 254 m.²/g., a density under 3 p.s.i. load of 0.09 gram per ml., silica equal to 78.7%, lead 6.02% and carbon 3.47%, said carbon being present as butoxy groups combined with the silica by the reaction with butanol.

*Example 7.*—In this case, the reticulated silica substrate has a skin of silica containing magnesium, the experiment being conducted essentially as the previous examples, except that a magnesium sulfate solution containing 25 grams of $MgSO_4 \cdot 7H_2O$ was used in applying the coating.

Surface area of the product obtained was 311 m.²/g., the hydroxylated surface area as measured by the absorption of methyl red dye was 82 m.²/g., the density was 0.10 gram per ml. under a load of 3 p.s.i., and the product was hydrophobic.

*Example 8.*—This is an example of a reticulated silica product which has a skin of silica containing iron.

A heel containing silica nuclei was prepared by reacting a sodium silicate solution containing 1.26 kilograms of a commercial sodium silicate (having an $SiO_2$ content of 28.4% and an $SiO_2:Na_2O$ mole ratio of 3.36) in a total volume of 18 liters, with a sulfuric acid solution containing 151 grams of 95.5% $H_2SO_4$ in a volume of 6 liters. The sodium silicate solution was placed in a reaction vessel containing a high speed stirrer and the sulfuric acid was added over a period of 30 minutes while maintaining the temperature at about 30° C. This solution was then heated to 95° C., and will hereinafter be referred to as the heel.

A heel as above prepared contains silica nuclei which are about 5 millimicrons in diameter and which have a specific surface area as measured by nitrogen adsorption of about 570 m.²/g. The silica nuclei in this heel were reticulated and surface coated with silica containing iron by adding a solution containing ferric sulfate and a solution of sodium silicate simultaneously but separately to the heel.

An iron sulfate solution was prepared by dissolving 722 grams of $Fe_2(SO_4)_3 \cdot (NH_4)_2SO_4 \cdot 24H_2O$ in water and diluting to a total volume of 3.6 liters. The sodium silicate solution was prepared by diluting 1.26 kilograms of commercial silicate of the type above used and 80 grams of sodium hydroxide pellets to a total volume of 3.6 liters. These solutions were added simultaneously but separately and at uniform rates to the heel, while maintaining a temperature of about 95° C. The resulting slurry was filtered, the precipitate washed with about 4 liters of water, and then the precipitate was slurried in 12 liters of water and the slurry pH adjusted to 7 with dilute sulfuric acid. This slurry was then filtered and the precipitate slurried with a large excess of n-butanol and the water removed by azeotropic distillation. The n-butanol slurry was then heated to a temperature of 295° C., cooled, and the butanol removed by drying in a conventional type oven at a temperature of 150° C. The resulting product had a surface area as measured by nitrogen adsorption of 291 m.²/g.

*Example 9.*—This example is similar to Example 8, except that the silica was surface coated with silica containing magnesium.

A heel was prepared according to the directions of Example 8, and this was then treated simultaneously but separately with solutions of sodium silicate and magnesium sulfate. The sodium silicate solution containing 1.26 kilograms of commercial sodium silicate ($SiO_2:Na_2O$ =3.36 mole ratio and $SiO_2$=29.4%) in 3.6 liters of water and the magnesium sulfate solution contained 370 grams of $MgSO_4 \cdot 7H_2O$ in a total volume of 3.6 liters.

The Si:Mg ratio in the resulting coating was 4.

The surface area of the product obtained from this reaction was about 300 m.²/g.

*Example 10.*—This is an example of a silica sol containing ultimate particles of silica having a diameter of about 17 millimicrons which was surface coated with sodium alumino-silicate, silica containing both aluminum and sodium.

A commercial silica sol known as "Ludox" and made according to the Bechtold and Snyder application above mentioned was used in preparing the heel. A sample of 13.3 grams of "Ludox" (containing 30% $SiO_2$ in the form of dense, amorphous, spherical silica particles having a diameter of about 17 millimicrons) was diluted to 400 mls. with water and 5.7 grams of sodium sulfate added. This solution was then heated to about 95° C.

To this heel, 3 solutions, a sulfuric acid solution, sodium silicate solution, and a sodium aluminate solution, were added simultaneously but separately, at uniform rates. The sulfuric acid solution was prepared by diluting 7.9 grams of 95.5% $H_2SO_4$ to a volume of one liter. The sodium silicate solution was prepared from 39.3 grams of commercial sodium silicate (containing 28.4% $SiO_2$ and having an $SiO_2:Na_2O$ mole ratio of 3.36) to a volume of one liter. The sodium aluminate solution was prepared by dissolving 9.65 grams of technical grade sodium aluminate (containing about 75% $NaAlO_2$, and about 10% NaOH) in water and diluting to a volume of one liter. These solutions were introduced into the heel through capillary tubes at a rate of 3.3 mls. per minute for each solution, until a total of 400 mls. of each had been added. During this reaction, the sol was very vigorously agitated and the temperature maintained at 95° C.

The product was a sol containing discrete, spherical particles, having a particle diameter of about 22 millimicrons as determined by electron micrograph. The sol had a pH of about 10.2.

Careful examination of the electron micrograph showed that some of the particles in the picture appeared to be a lighter shade in the middle, thus giving them the appearance of being hollow. This is undoubtedly due to the fact that the silica nuclei in the center of the particles are less opaque to the electron beam than the sodium alumino-silicate coating.

It can be calculated that the Si:Al ratio in the coating of the particles is 2.6, and it can further be shown that approximately 85% of the alumina in the coating is in the four coordinate position, and as such is accompanied by one sodium atom for each aluminum atom. This sodium can be determined by chemical analysis and can further be ion exchanged for such ions as potassium, ammonium, and calcium.

*Example 11.*—This example is similar to Example 10, except that the sodium silicate solution used in the feed containing 0.215 molar $SiO_2$, the sodium aluminate solution was 0.141 molar in $Al^{+++}$, and the sulfuric acid solution was 0.170 N in $H_2SO_4$.

In this case, the Si:Al ratio was 1.5. The product was a sol having a pH of about 10.

*Example 12.*—This example is similar to Example 10, except that the sodium aluminate solution was 0.116 molar in $Al^{+++}$, and the sulfuric acid solution 0.167 N in $H_2SO_4$.

Thus, the Si:Al ratio was 2.0, the product being a sol having a pH of about 10.

*Example 13.*—This example is similar to Example 12, except that the additions of acid, silicate and aluminate were made at a temperature of 30° C. instead of 100° C. The product was a silica sol, which, however, was less stable and tended to gel. An electron micrograph of this product shows considerable aggregation of the ultimate particles.

*Example 14.*—This example is similar to Example 12, in which the Si:Al ratio was 2.0, except that 0.214 N sulfuric acid was used, resulting in a much lower pH during the reaction, giving a product of pH about 6 in the form of a slurry. An electron micrograph examination of the product indicated that the ultimate units were aggregated and had a diameter of about 23 millimicrons. The growth from 17 to 23 millimicrons being due to a deposited layer of alumino-silicate.

*Example 15.*—This is an example of a coating of sodium aluminum silicate on silica nuclei, these silica nuclei having a particle diameter of about 21 millimicrons as determined by electron micrograph.

The heel consisted of 20 liters of a silica sol containing 1.5% $SiO_2$ and having a pH of about 10. This sol was heated to a temperature of 95° C. and coated with a skin of sodium aluminum silicate in the following fashion.

Solutions of sodium silicate, sodium aluminate, and sulfuric acid were added simultaneously but separately, at uniform rates over a period of two hours, and while maintaining vigorous mixing to the heel. The sodium silicate solution was prepared by diluting 1.01 kilograms of commercial sodium silicate (containing 29.6% $SiO_2$ and having an $SiO_2$:$Na_2O$ mole ratio of 3.36) to a total volume of 4 liters. The sodium aluminate solution contained 400 grams of technical grade sodium aluminate in a volume of 4 liters. The sulfuric acid solution was prepared by diluting 130 grams of 95.5% $H_2SO_4$ to a total volume of 2 liters.

The resulting product was a slurry containing reticulated particles having a sodium alumino-silicate coating. The Si:Al ratio on this coating was about 1.05. This slurry, which had a pH of about 12, was filtered, the filter cake reslurried in a large volume of water, and the pH of this slurry adjusted to 7.0 with dilute sulfuric acid, and the resulting slurry refiltered. This wet filter cake was further washed with water and finally dried in an oven at a temperature of 120° C.

The final product had a particle diameter as determined by electron micrograph examination of 28 millimicrons, and when slurried in distilled water had a pH of about 8.7. A sample of this material was milled into rubber at 30 volume loading, using 2 parts of MBTS and 0.1 part of Thiuram M; the cured rubber had a modulus of 1040, a tensile strength of 3875, a tear strength of 750, and elongation at break of 630, and a hardness of 64. It is thus apparent that this material imparts valuable reinforcing characteristics to rubber filled stock. The product is further useful as a synthetic zeolite, since it contains considerable sodium which can be ion-exchanged with many ions such as potassium, calcium, magnesium, zinc, iron, and ammonium, and further, in the hydrogen form, this product is valuable as a cracking catalyst.

*Example 16.*—The substrate employed is a titanium dioxide pigment having a surface area of 40 m.²/g. and consisting of loose aggregates of particles having an average size of 80 millimicrons. Forty parts by weight is slurried in 1000 parts by weight of water and the pH is adjusted to 9.0 by adding a 1 N sodium hydroxide solution.

The resulting slurry is heated to 95° C. and solutions of zinc sulfate and sodium silicate are added simultaneously, but separately, at uniform rates, over a period of eight hours while maintaining the temperature at about 95° C. and the pH between 8 and 9. The sodium silicate solution is prepared by diluting 100 parts by weight of commercial sodium silicate containing 29.4% $SiO_2$ and having an $SiO_2$:$Na_2O$ mole ratio of 3.36:1 to 1000 parts by weight of water. The zinc sulfate solution is prepared by dissolving 30 parts by weight of zinc sulfate, $ZnSO_4 \cdot 7H_2O$ in water, adding 10 parts by weight of 95.5% $H_2SO_4$, and diluting to a total of about 100 parts by weight. The ratio of silicon to zinc is 4.7:1.

The resulting slurry is filtered, the precipitate washed with water, reslurried in water which has a pH of 8, and refiltered. This water-wet filter cake is then dried in an open at 120° C. The final product has a specific surface area of 31 m.²/g. and is a finely divided type titania powder having a dense, adherent, uniform coating of zinc silicate thereupon. The coating has an average thickness of about 20 millimicrons. The product is useful as a pigment in paints.

The product of this example is illustrated in the drawings. In Figure 3 there will be seen the aggregates of particles, 4, of the final slurry. It will be seen, in the cross section, that these are composed of a core 3, of loosely aggregated titanium dioxide particles, covered with a skin 1, consisting of silica which contains chemically combined aluminum.

The nature of the boundary 2 where the core and skin come into contact is illustrated in Figure 2. In this figure there will be seen a representation of the crystal lattice at the boundary. Above the boundary line there will be seen the skin 1 which is shown as composed of a crystal lattice in which aluminum occurs together with silicon and oxygen. Below the line the substrate 2 will be seen as represented by titanium and oxygen in a lattice.

*Example 17.*—Following the procedure as in Example 16, a finely divided alumina powder, $Al_2O_3$, having a specific surface area of 145 m.²/g. is coated with a skin of silica which contains chemically combined zinc. The pH during the coating process is held between 8 and 10 and the average thickness of coating is about 5 millimicrons. The ratio of silicon to zinc is as in Example 16.

The coated product has a final specific surface area of about 90 m.²/g.

*Example 18.*—Finely divided iron oxide is prepared by reacting a 0.5 molar solution of ferric chloride with an equivalent amount of 0.5 N sodium hydroxide. Normal propanol is added to the aqueous suspension and water is removed by azeotropic distillation. The bulk of the propanol is distilled off and the product finally oven dried at 110° C. The resulting iron hydroxide powder has a surface area of 350 m.²/g.

The finely divided iron oxide powder is then coated by the process of Example 8, except that finely divided iron oxide is used as a substrate instead of silica. The iron oxide is slurried in water to a concentration of about 2% solids. The pH of the coating process is about 9 to 10 and the average thickness of the coating is about 3 millimicrons. The ratio of silicon to iron is 4:1. The surface area of the product is 250 m.²/g.

*Example 19.*—A dispersion of attapulgite is prepared by dispersing the mineral in a dilute solution of sodium pyrophosphate. The starting material has a surface area of 150 m.$^2$/g. and it consists of rod-like particles 20 millimicrons in diameter.

The attapulgite is coated following a process as in Example 1 but using as a substrate dispersion a dispersion containing 1% of solid attapulgite and 5% sodium pyrophosphate based on the weight of attapulgite.

1000 parts by weight of attapulgite slurry having a pH of 9.0 is heated in a closed reactor to 120–125° C. To this slurry are added: (*a*) 250 parts of sodium silicate solution prepared by diluting 33 parts of commercial silicate containing 28.4% SiO$_2$, and having an SiO$_2$:Na$_2$O ratio of 3.25:1, (*b*) 250 parts of sodium aluminate solution, prepared by dissolving 3 parts of 75% NaAlO$_2$ in water and diluting, and (*c*) 250 parts of 0.4 N H$_2$SO$_4$. These three solutions are added to the dispersion over a period of 2 hours at uniform rates and in separate streams. During the addition, the pH of the slurry is maintained in the range of 8 to 10. The solutions are forced into the reactor through capillary tubes and impinge in a zone of vigorous stirring. The ratio of silicon to aluminum is 5.7:1.

The resulting product is a dispersion of attapulgite which has a dense, adherent, uniform coating of silica which contains chemically combined aluminum. The coating has an average thickness of about 6 millimicrons and the product surface area is 110 m.$^2$/g.

*Example 20.*—This is an example of a coating of sodium aluminum silicate on silica nuclei, the silica particles having a diameter of about 20 millimicrons as determined by electron micrograph, and a surface area, as measured by nitrogen adsorption, of 150 m.$^2$/g.

The substrate used consists of 5000 parts by weight of a silica sol containing 1.5% SiO$_2$ and having a pH of 9.5. This sol is heated to a temperature of 95° C. and coated with a skin of sodium aluminum silicate in the following manner:

1000 parts each of solutions of sodium silicate, sodium aluminate and sulfuric acid are added simultaneously, but separately, at uniform rates over a period of three hours, and while maintaining vigorous mixing to the heel. The sodium silicate solution is prepared by diluting 250 parts of commercial sodium silicate (containing 29.6% SiO$_2$ and having an SiO$_2$:Na$_2$O mole ratio of 3.36). The sodium aluminate solution contains 0.75 parts of technical grade sodium aluminate. The sulfuric acid solution is prepared by diluting 36 parts of 95.5% H$_2$SO$_4$. During the addition of the solutions the pH of the sol remains between 7.5 and 10.0.

The product is a sol containing discrete, spherical particles, having a particle diameter of about 26 millimicrons, as determined by electron micrograph, and a surface area of 120 m.$^2$/g., by nitrogen adsorption measurement. The sol has a pH of 8.5. The thickness of the resulting coating is 3 millimicrons and the Si:Al ratio in this coating is about 190.

This application is a continuation-in-part of my copending application Serial No. 252,989, filed October 24, 1951, now abandoned.

I claim:

1. In a process for making products composed of particles which have a dense skin of amorphous silica, containing chemically combined metal atoms chemically bound upon a core of another solid material, the steps comprising adding active silica together with a solution containing ions of a metal which forms an insoluble silicate at a pH between 5 and 12 to an aqueous suspension of a finely divided, solid material which has a surface area of at least one square meter per gram, the particles of said material having a particle size within the range from 1 to 100 millimicrons and having upon their surfaces a compound selected from the group consisting of silicates, silica, and oxides of metals which forms an insoluble silicate at a pH between 5 and 12, the pH of said suspension being maintained between 8 and 11, the temperature being maintained between 60 and 100° C., the ratio of silicon atoms to metal atoms added to the suspension being from 1:1 to 10:1, the addition of active silica being made slowly enough so that the surface area per gram of particles in the system does not increase, whereby the active silica becomes chemically combined with the surface of the particles, and continuing the addition until the particles are coated with a skin having a thickness within the range of 3 to 25 millimicrons.

2. In a process for making products composed of particles which have a dense skin of amorphous silica, containing chemically combined metal atoms chemically bound upon a core of another solid material, the steps comprising adding active silica together with a solution containing ions of a metal which forms an insoluble silicate at a pH between 5 and 12 to an aqueous suspension of a finely divided, solid material which has a surface area of at least one square meter per gram, the particles of said material having at least one dimension less than 5 microns and having upon their surfaces a metal compound selected from the group consisting of silicates, silica, and oxides of metals which forms an insoluble silicate at a pH between 5 and 12, the pH of said suspension being maintained between 5 and 12, the temperature being maintained between 60 and 125° C., the ratio of silicon atoms to metal atoms added to the suspension being from 1:1 to 200:1, the addition of active silica being made slowly enough so that the surface area per gram of particles in the system does not increase, whereby the active silica becomes chemically combined with the surface of the particles, and continuing the addition until the particles are coated with a skin having a thickness within the range of 3 to 50 millimicrons.

3. In a process for making products composed of particles which have a dense skin of amorphous silica, containing chemically combined metal atoms chemically bound upon a core of another solid material, the steps comprising adding active silica together with a solution containing ions of a metal which forms an insoluble silicate at a pH between 5 and 12 to an aqueous suspension of a finely divided, solid material made up of aggregates of particles at least one dimension of which is less than 5 microns and having a surface area of at least one square meter per gram, the particles having upon their surfaces a compound selected from the group consisting of silicates, silica, and oxides of metals which forms an insoluble silicate at a pH between 5 and 12, the pH of said suspension being maintained between 5 and 12, the temperature being maintained between 60 and 125° C., the ratio of silicon atoms to metal atoms added to the suspension being from 1:1 to 200:1, the addition of active silica being made slowly enough so that the surface area per gram of particles in the system does not increase, whereby the active silica becomes chemically combined with the surface of the particles, and continuing the addition until the particles are coated with a skin having a thickness within the range of 3 to 50 millimicrons.

4. In a process for making products composed of a dense skin of amorphous silica, containing chemically combined metal atoms chemically bound upon a core of another solid material, the steps comprising suspending in water a substrate which has on its surface a compound selected from the group consisting of silicates, silica, and oxides of metals which form an insoluble silicate at a pH from 5 to 12 and which has a surface area of at least one square meter per gram and adding simultaneously active silica and a solution containing ions of a metal which forms an insoluble silicate at a pH between 5 and 12, the pH being maintained between 5 and 12 and the addition being carried out slowly enough so that the specific surface area of the product is less than that of the substrate, the system being maintained at a temperature between 60 and 125° C., whereby the active silica becomes chemically combined with the surface of the substrate.

5. In a process for making products composed of a dense skin of amorphous silica, containing chemically combined metal atoms chemically bound upon a core of another solid material, the steps comprising suspending in water a siliceous substrate which has a specific surface area of at least one square meter per gram and adding simultaneously sodium silicate, acid, and a solution containing aluminum ions, the pH being maintained between 5 and 12 and the addition being carried out slowly enough so that the specific surface area of the product is less than that of the substrate, the system being maintained at a temperature between 60 and 100° C., whereby the active silica becomes chemically combined with the surface of the substrate.

6. In a process for making products composed of a dense skin of amorphous silica, containing chemically combined metal atoms chemically bound upon a core of another solid material, the steps comprising suspending in water a substrate which has on its surface a compound selected from the group consisting of silicates, silica, and oxides of metals which form an insoluble silicate at a pH from 5 to 12 and which has a surface area of at least one square meter per gram and adding simultaneously active silica and a solution containing ions of a metal which forms an insoluble silicate at a pH between 5 and 12, the pH being maintained between 5 and 12 and the addition being carried out slowly enough so that the specific surface area of the product is less than that of the substrate, the system being maintained at a temperature between 60 and 125° C., and the ratio of silicon atoms to metal atoms added to the substrate being from 1:1 to 200:1, whereby the active silica becomes chemically combined with the surface of the substrate.

7. An aqueous dispersion of particles which have a dense skin of amorphous silica, containing chemically combined metal atoms, chemically bound upon a core of another solid material, the core being composed of particles of average diameter from 1 to 100 millimicrons and having a surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH between 5 and 12, and the ratio of silicon atoms to metal atoms in the skin being from 1:1 to 10:1.

8. An aqueous dispersion of particles which have a dense skin of amorphous silica, containing chemically combined metal atoms, chemically bound upon a core of another solid material, the core being composed of particles having at least one dimension less than 5 microns and having a surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH btween 5 and 12, and the ratio of silicon atoms to metal atoms in the skin being from 1:1 to 200:1.

9. A product composed of particles which have a dense skin of amorphous silica, containing chemically combined metal atoms, chemically bound upon a core of another solid material, the core being composed of particles of average diameter from 1 to 100 millimicrons and having a surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH between 5 and 12, and the ratio of silicon atoms to metal atoms in the skin being from 1:1 to 200:1.

10. A product composed of particles which have a dense skin of amorphous silica, containing chemically combined metal atoms, chemically bound upon a core of another solid material, the core being composed of particles having at least one dimension less than 5 microns and having a surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH between 5 and 12, and the ratio of silicon atoms to metal atoms in the skin being from 1:1 to 200:1.

11. A product composed of a dense skin of amorphous silica, containing chemically combined metal atoms, chemically bound upon a substrate of another solid material, the substrate having a specific surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH between 5 and 12, and the ratio of silicon atoms to metal atoms in the skin being from 1:1 to 200:1.

12. A product composed of a dense skin of amorphous silica, containing chemically combined metal atoms, chemically bound upon a core of another solid material, the core being composed of a finely divided, solid material made up of aggregates of particles at least one dimension of which is less than 5 microns and having a surface area greater than one square meter per gram, the skin having a thickness within the range from 3 to 50 millimicrons, the density of the skin being such that the surface area per gram of the product is lower than that of the core material, the said chemically combined metal being one which forms an insoluble silicate at a pH between 5 and 12, and the ratio of silicon atoms to metal atoms in the skin being from 1:1 to 200:1.

13. A product composed of a dense skin of amorphous silica, containing aluminum, chemically bound upon a core of another solid material, the core being composed of a finely divided, solid material made up of aggregates of particles at least one dimension of which is less than 5 microns and having a surface area greater than one square meter per gram, the skin having a thickness within the range from 3 to 50 millimicrons, the density of the skin being such that the surface area per gram of the product is lower than that of the core material, and the ratio of silicon atoms to metal atoms in the skin being from 1:1 to 200:1.

14. A product composed of a dense skin of amorphous silica, containing chemically combined aluminum, chemically bound upon a core of a siliceous material, the core being composed of a finely divided, siliceous material made up of aggregates of particles at least one dimension of which is less than 5 microns and having a surface area greater than one square meter per gram, the skin having a thickness within the range from 3 to 50 millimicrons, the density of the skin being such that the surface area per gram of the product is lower than that of the core material, and the ratio of silicon atoms to metal atoms in the skin being from 1:1 to 200:1.

References Cited in the file of this patent
UNITED STATES PATENTS

| Number | Name | Date |
|---|---|---|
| 2,085,129 | Stoewener | June 29, 1937 |
| 2,267,767 | Thomas | Dec. 30, 1941 |
| 2,280,649 | Kanhofer | Apr. 21, 1942 |
| 2,289,919 | Lee et al. | July 14, 1942 |
| 2,469,314 | Ryland et al. | May 3, 1949 |
| 2,484,258 | Webb et al. | Oct. 11, 1949 |
| 2,657,183 | Bechtold | Oct. 27, 1953 |
| 2,663,650 | Iler | Dec. 22, 1953 |
| 2,665,258 | Lebeis | Jan. 5, 1954 |